United States Patent
Vuillamy et al.

(10) Patent No.: US 10,082,106 B2
(45) Date of Patent: Sep. 25, 2018

(54) PROPELLANT FEED CIRCUIT AND A COOLING METHOD

(71) Applicant: SNECMA, Paris (FR)

(72) Inventors: Didier Vuillamy, Quincampoix (FR); Gérard Roz, Pressagny l'Orguilleux (FR)

(73) Assignee: Arianegroup SAS, Paris (FR)

( * ) Notice: Subject to any disclaimer, the term of this patent is extended or adjusted under 35 U.S.C. 154(b) by 146 days.

(21) Appl. No.: 14/760,190

(22) PCT Filed: Jan. 10, 2014

(86) PCT No.: PCT/FR2014/050046
§ 371 (c)(1),
(2) Date: Jul. 9, 2015

(87) PCT Pub. No.: WO2014/108650
PCT Pub. Date: Jul. 17, 2014

(65) Prior Publication Data
US 2015/0337763 A1    Nov. 26, 2015

(30) Foreign Application Priority Data
Jan. 11, 2013 (FR) ...................................... 13 50239

(51) Int. Cl.
*F02K 1/00* (2006.01)
*F02K 9/60* (2006.01)
(Continued)

(52) U.S. Cl.
CPC .................. *F02K 9/60* (2013.01); *F02K 9/46* (2013.01); *F02K 9/605* (2013.01); *F02K 9/40* (2013.01);
(Continued)

(58) Field of Classification Search
CPC ..... F02K 9/40; F02K 9/42; F02K 9/44; F02K 9/46; F02K 9/64; F02K 9/972
See application file for complete search history.

(56) References Cited

U.S. PATENT DOCUMENTS

| | | |
|---|---|---|
| 3,049,870 A | 8/1962 | Chamberlain |
| 3,143,855 A | 8/1964 | Abild |

(Continued)

FOREIGN PATENT DOCUMENTS

| | | |
|---|---|---|
| EP | 1 241 341 A1 | 9/2002 |
| FR | 2 921 979 A1 | 4/2009 |

(Continued)

OTHER PUBLICATIONS

Search Report dated Jun. 20, 2014, in corresponding International PCT Application No. PCT/FR2014/050046, filed on Jan. 10, 2014 (2 pages).

(Continued)

*Primary Examiner* — Gerald L Sung
(74) *Attorney, Agent, or Firm* — Bookoff McAndrews, PLLC

(57) ABSTRACT

The invention relates to the aerospace field, and in particular to the field of vehicles propelled by rocket engines. In particular, the invention relates to a feed circuit (6) for feeding a rocket engine (2) at least with a first liquid propellant, the feed circuit including at least one first heat exchanger (18) suitable for being connected to a cooling circuit (17) for cooling at least one heat source in order to cool said heat source by transferring heat to the first propellant, and, in addition, downstream from said first heat exchanger, a branch passing through a second heat exchanger.

9 Claims, 2 Drawing Sheets

(51) Int. Cl.
*F02K 9/46* (2006.01)
*F02K 9/64* (2006.01)
*F02K 9/40* (2006.01)
*F02K 9/97* (2006.01)

(52) U.S. Cl.
CPC ............ *F02K 9/64* (2013.01); *F02K 9/972* (2013.01); *F05D 2260/20* (2013.01); *F05D 2260/205* (2013.01)

(56) References Cited

U.S. PATENT DOCUMENTS

| | | | |
|---|---|---|---|
| 4,771,600 A | | 9/1988 | Limerick et al. |
| 5,025,623 A | * | 6/1991 | Hirakoso .............. F02K 9/42 60/257 |
| 5,551,230 A | | 9/1996 | Meng |
| 5,644,920 A | | 7/1997 | Lak |
| 6,116,030 A | * | 9/2000 | Story .................. F02K 9/42 62/100 |
| 6,581,882 B2 | | 6/2003 | Valentian |
| 7,418,814 B1 | | 9/2008 | Greene |
| 7,784,268 B1 | | 8/2010 | Greason et al. |
| 7,784,269 B1 | | 8/2010 | Greason et al. |
| 9,261,295 B1 | * | 2/2016 | Schmidt .............. F25B 9/002 |
| 9,446,862 B2 | | 9/2016 | Barthoulot |
| 2002/0139902 A1 | * | 10/2002 | Valentian ............ B64G 1/401 244/171.1 |
| 2002/0184873 A1 | * | 12/2002 | Dujarric ............... F03H 99/00 60/203.1 |

FOREIGN PATENT DOCUMENTS

| | | |
|---|---|---|
| FR | 2 976 626 A1 | 12/2012 |
| WO | WO 99/42706 | 8/1999 |
| WO | WO 03/078818 A1 | 9/2003 |

OTHER PUBLICATIONS

Search Report dated Jun. 20, 2014, in International PCT Application No. PCT/FR2014/050045, filed on Jan. 10, 2014 (2 pages).

* cited by examiner

PROPELLANT FEED CIRCUIT AND A COOLING METHOD

This application is the U.S. national phase entry under 35 U.S.C. § 371 of International PCT Application No. PCT/FR2014/050046, filed on Jan. 10, 2014, which claims priority to French Patent Application No. FR 1350239, filed on Jan. 11, 2013, the entireties of each of which are incorporated by reference herein.

BACKGROUND OF THE INVENTION

The present invention relates to the aerospace field, and in particular to the field of vehicles propelled by rocket engines.

In the description below, the terms "upstream" and "downstream" are defined relative to the normal flow direction of propellants in the feed circuits of a rocket engine.

One of the main concerns in this field is that of obtaining satisfactory cooling of on-board heat sources. Specifically, in order to ensure that they operate properly, certain heat-generating devices, e.g. such as fuel cells, and batteries or electronic circuits, may need to have their operating temperatures maintained within a relatively narrow temperature range. However, constraints specific to this field can make it very difficult to remove the heat generated by such devices. In particular in the vacuum of space, there are very few channels for removing heat.

OBJECT AND SUMMARY OF THE INVENTION

The present invention seeks to remedy those drawbacks. In particular, the invention seeks to propose a feed circuit for feeding a rocket engine with at least a first liquid propellant, which circuit also serves to cool at least one heat source.

This object is achieved by the fact that the feed circuit includes at least one first heat exchanger suitable for being connected to a cooling circuit for cooling the at least one heat source, and in addition, downstream from said first heat exchanger, a branch passing through a second heat exchanger. Thus, in operation, the heat generated by the heat source can be removed via the cooling circuit and said first heat exchanger to the liquid propellant in the feed circuit of the rocket engine. Unlike regenerative cooling of a rocket engine thrust chamber wall, in which the thrust chamber is cooled directly by the propellant, this cooling thus takes place via the intermediary of a cooling circuit interposed between the heat source and the propellant flowing through the feed circuit, thereby potentially enabling the temperature of the heat source to be regulated more accurately by the potential for regulating the flow rate of cooling fluid in the cooling circuit. The second heat exchanger can allow a flow of the first propellant diverted through said branch to pass into the gaseous state, even when the heat power of said heat generating device, on its own, is insufficient for that purpose. This flow of gas can thus be used, by way of example, for maintaining the internal pressure of a tank supplying the feed circuit with the first propellant as it empties. To do this, said branch may lead to a high portion of this tank for the first propellant, in order to reinject the first propellant in the gaseous state. The present description therefore also relates to the assembly comprising the feed circuit and a tank for said first liquid propellant, the tank being connected to the feed circuit upstream from said first heat exchanger, and also to said branch downstream from said second heat exchanger.

The present description also relates to the assembly comprising said feed circuit and the heat source provided with a cooling circuit connected to said first heat exchanger of the feed circuit. The heat source may in particular be a fuel cell. By way of example, such a fuel cell may be fed with the same propellants as the rocket engine in order to generate electricity for on-board systems of a vehicle propelled by the rocket engine. Alternatively, other types of on-board heat source, e.g. such as batteries or electronic circuits, could nevertheless be cooled in the same manner.

The present invention also relates to a vehicle comprising a rocket engine with said feed circuit and an on-board heat generating device with a cooling circuit connected to said first heat exchanger of the feed circuit. This vehicle may, for example, be a stage of a space launcher, a satellite, or any other type of vehicle that is propelled by a liquid propellant rocket engine.

In a second aspect, said feed circuit may in particular also include a first heat exchanger, thus making it possible to increase the heat power that is absorbed, even when the feed circuit is off and said first propellant is not flowing.

In a third aspect, said first liquid propellant may in particular be a cryogenic liquid, and in particular liquid hydrogen, thus providing cooling that is even more effective because of its low temperature.

In a fourth aspect, said feed circuit may include a pump upstream from said first heat exchanger. This pump may, for example, be an electric pump or a turbopump. Nevertheless, the feed circuit could alternatively be configured in such a manner as to make the first propellant flow by other means, e.g. such as by pressurizing a tank upstream.

In a fifth aspect, said second heat exchanger may be incorporated in a tank for a second liquid propellant so as to be capable of heating the first liquid propellant by transferring heat from the second liquid propellant. In particular when the second liquid propellant presents a boiling point that is significantly higher than the first liquid propellant (for example when the first liquid propellant is liquid hydrogen and the second liquid propellant is liquid oxygen), this makes it possible not only to ensure that the first propellant passes into the gaseous phase in the second heat exchanger, but also, simultaneously, to cool the second propellant. This cooling of the second propellant makes it possible to avoid cavitation in a pump downstream from the second tank. The present description thus also relates to an assembly of this feed circuit and a tank for a second liquid propellant, and containing said second heat exchanger.

Finally, the present description also relates to a method of cooling a heat source, in which a cooling circuit of said heat source transfers the heat generated by the heat source to a first liquid propellant of a rocket engine via a first heat exchanger of a feed circuit for feeding said rocket engine at least with said first liquid propellant. After this heat has been absorbed in the first heat exchanger, a portion of the flow of the first liquid propellant can then be diverted through the second heat exchanger in which it absorbs heat from a second propellant so as to reach the gaseous state prior to being injected into the tank for the first propellant feeding the feed circuit. As specified above, this first heat exchanger is contained in a buffer tank of the feed circuit for feeding the first propellant, and the heat source may be a fuel cell.

BRIEF DESCRIPTION OF THE DRAWINGS

The invention can be well understood and its advantages appear better on reading the following detailed description of embodiments given as nonlimiting examples. The description refers to the accompanying drawings, in which.

DETAILED DESCRIPTION OF THE INVENTION

Figure 1:
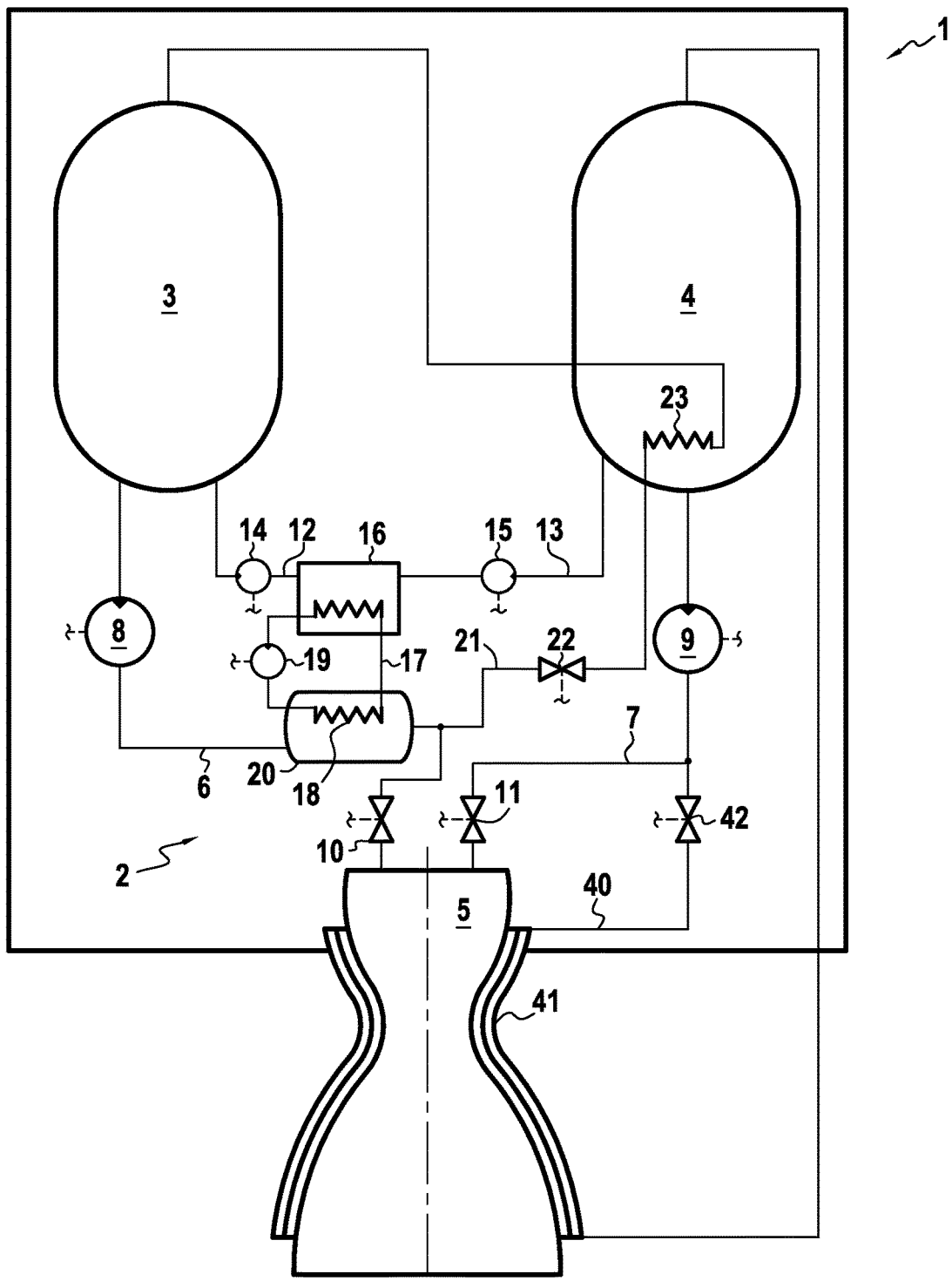
FIG. 1 is a diagrammatic view of a vehicle in a first embodiment of the invention.

FIG. 1 is a diagram showing a vehicle 1, which may for example be a stage of a space launcher. For its propulsion, this vehicle 1 has a liquid propellant rocket-engine 2 with a first tank 3 for a first propellant, a second tank 4 for a second propellant, a thrust chamber 5 for combustion of a mixture of the two propellants and for accelerating the gas that results from combustion of the mixture, a first feed circuit 6 connected to the first tank 3 and to the first chamber 5 in order to bring the first propellant from the first tank 3 to the thrust chamber 5, and a second feed circuit 7 connected to the second tank 4 and to the thrust chamber 5 in order to bring the second propellant from the second tank 4 to the thrust chamber 5. The first and second propellants may be cryogenic propellants such as liquid hydrogen and liquid oxygen. Each of the feed circuits 6, 7 comprises a pump 8, 9 for causing the respective propellant to flow through each feed circuit 6, 7, and outlet valves 10, 11 in order to open and close the flow of propellants to the thrust chamber 5. By way of example, these pumps 8, 9 may be electric pumps, or they may be turbopumps.

In addition, for providing electrical power to on-board equipment, the vehicle 1 also has an on-board fuel cell 16 adapted to generate electricity as a result of a chemical reaction between the two propellants, which fuel cell is connected to feed circuits 12, 13 in order to be fed with these two propellants. Each of these circuits 12, 13 includes a micro-pump 14, 15 for controlling the flow rate of fuel supplied to the fuel cell 16. Nevertheless, because of the internal pressure in the tanks 3, 4, the micro-pumps 14, 15 could possibly be replaced by variable flow rate valves, with the internal pressure of the tanks 3, 4 then sufficing to cause the propellants to flow towards the fuel cell 16.

The fuel cell 16 is also provided with a cooling circuit 17 containing a cooling fluid such as, for example, helium and connected to a heat exchanger 18 incorporated in a buffer tank 20 of the feed circuit 6 for the first propellant. In the vehicle 1 shown, the flow of this cooling circuit in the cooling circuit 17 may be driven by, and may be regulated by means of a variable flow rate forced flow device 19, which device is in the form of a fan in the embodiment shown. Nevertheless, other alternatives could be envisaged both for driving the flow of cooling fluid and for regulating it. Thus, the cooling fluid could be driven by a thermosiphon, and its flow rate could be regulated by at least one variable flow rate valve.

Downstream from the buffer tank 20, the feed circuit 6 also includes a branch 21 returning to the top of the first tank 3 via a variable flow rate valve 22, and a second heat exchanger 23 that is incorporated in the base of the second tank 4 in the proximity of its connection to the second feed circuit 7. Downstream from the pump 9, the second circuit 7 also has a return branch 40 returning to the top of the second tank 4, and passing through another heat exchanger 41 arranged around the thrust chamber 5 so as to be heated thereby by means of radiation or conduction. Upstream from the heat exchanger 41, this branch 40 also includes a valve 42, which may be a variable flow rate valve, thereby enabling the flow rate through the branch 40 to be regulated accurately.

In operation, after the valves 10 and 11 have been opened, the pumps 8, 9 drive the propellants via the feed circuits 6, 7 to feed the thrust chamber 5. The heat generated by the fuel cell 16, which is fed simultaneously with propellants via the feed circuits 12, 13 in order to generate electricity, is removed via the cooling circuit 17 and the heat exchanger 18 to the first propellant flowing through the feed circuit 6. In particular, in the embodiment described, the very low temperature of this first propellant, when it is a cryogenic liquid, enables this heat to be removed extremely effectively.

Because of the buffer tank 20, it is possible to remove a greater quantity of heat given off by the fuel cell 16 to the first propellant, with this continuing to apply even when the valves 10, 11 are closed and the pumps 8, 9 are off. A volume $V_t$ of 30 liters (L) of liquid hydrogen in the buffer tank 20 can thus absorb the quantity of heat that corresponds to thermal power $P_c$ of 100 watts (W) for one hour with a temperature rise $\Delta T$ of only 17 kelvins (K) in the liquid hydrogen.

After being heated by the heat exchanger 18, a portion of the flow of the first propellant leaving the first tank 3 through the first feed circuit 6 is diverted through the branch 21 to the second heat exchanger 23, in which it absorbs additional heat power from the higher-temperature second propellant, thereby passing into the gaseous state, prior to being injected into the top of the first tank 3 so as to maintain its internal pressure while it is emptying. If the first propellant is liquid hydrogen and the second propellant is liquid oxygen, the temperature difference between their respective boiling points at atmospheric temperature is nearly 70 K, thus enabling a more than adequate quantity of heat to be transferred for vaporizing the liquid hydrogen before their temperatures become equal, with this applying even when the liquid hydrogen is flowing at a high rate relative to the volume of liquid oxygen contained in the second tank. Simultaneously, this absorption of heat by the second propellant in the second heat exchanger 23 cools the second propellant, thereby enabling the saturation pressure of the second propellant being fed to the pump 9 to be reduced so as to reduce cavitation phenomena in the pump. This also makes it possible to allow the pressure and the temperature of the second propellant to fluctuate more widely in the second tank 4.

At the same time, in order to maintain the pressure in the second tank 4, a portion of the flow of the second propellant extracted from the second tank 4 via the second circuit 7 is diverted through the branch 40 and is heated in the heat exchanger 41 the by heat radiation from the thrust chamber 5, or by heat conduction, so that it passes into the gaseous phase prior to being reinjected into the second tank 4, in order to maintain the internal pressure therein. This diversion of flow is controlled by the valve 42.

Figure 2:
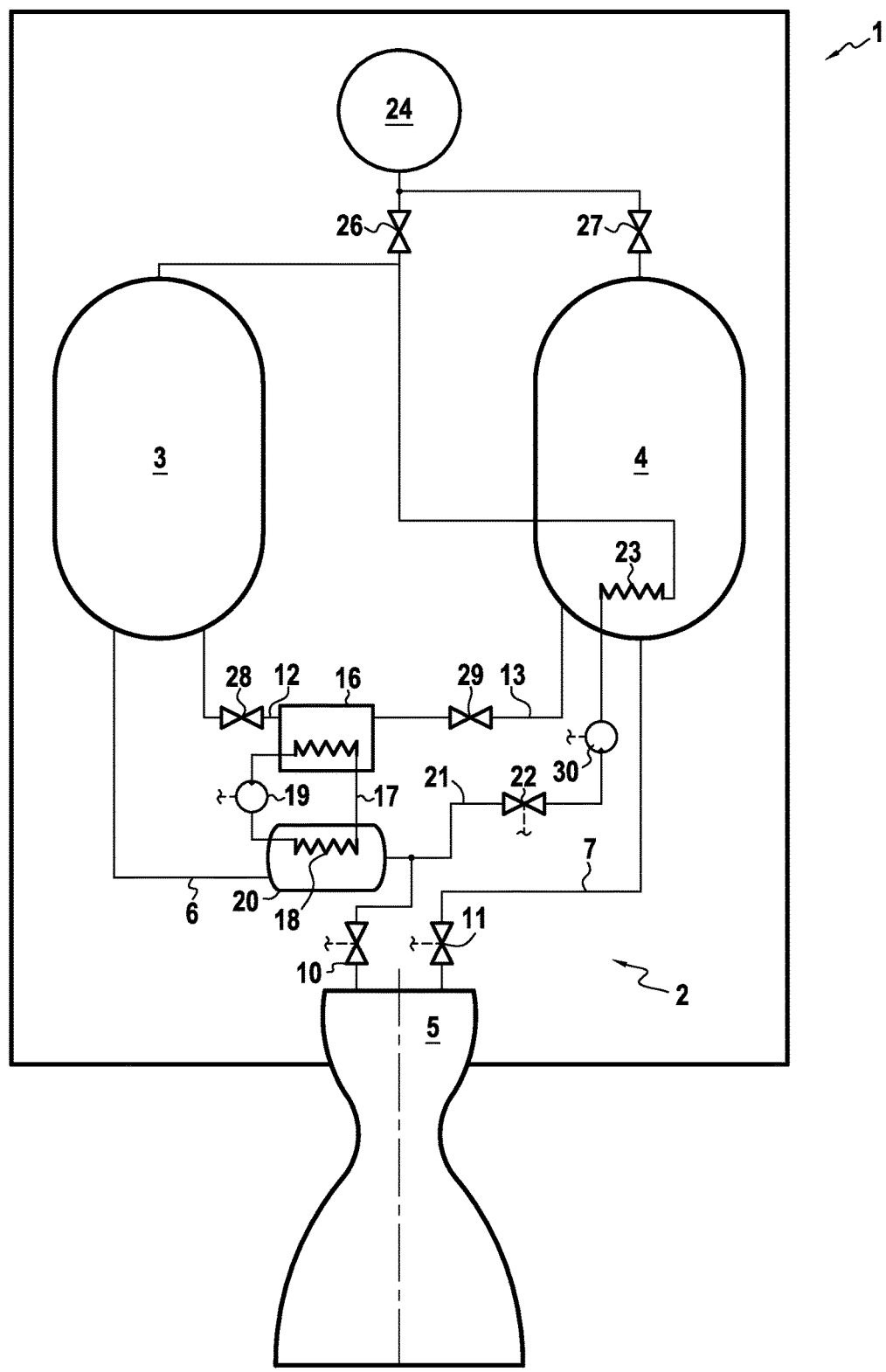
FIG. 2 is a diagrammatic view of a vehicle in a second embodiment of the invention.

Nevertheless, as an alternative to the pumps 8 and 9 in the first embodiment, the flow of the propellants to the thrust chamber can also be provided by other means, for example such as pressurizing the tanks. Thus, in a second embodiment as shown in FIG. 2, these pumps are replaced by a tank 24 of pressurized gas, e.g. helium, connected to the propellant tanks 3 and 4 via respective valves 26 and 27. Thus, in operation, the pressure of helium from the pressurized gas tank 24 pushes the propellants through their respective feed circuits 6, 7 towards the thrust chamber 5. Pressurizing the propellants in the tanks 3, 4 also makes it possible to omit micro-pumps for feeding the fuel cell 16 with propellants, with this feed being regulated in this embodiment by variable flow rate valves 28, 29 in the circuits 12, 13.

Finally, in order to enable the propellant that has been diverted via the branch 21 to be reinjected in the gaseous phase into the top of the first tank 3, this branch 21 includes a forced flow device 30, more specifically in the form of a fan or a pump. The other elements of this vehicle 1 are essentially equivalent to elements of the first embodiment, and they are given the same reference numbers.

Although the present invention is described above with reference to specific embodiments, it is clear that various modifications and changes can be made to these embodiments without going beyond the general ambit of the invention as defined by the claims. Also, individual characteristics of the various embodiments described may be combined in additional embodiments. Thus, and by way of example, in a variant of the second embodiment, the vehicle could also have a branch for injecting the second propellants in the gaseous phase into the second tank, as in the first embodiment, including a device for forced flow of the second propellants in the gaseous phase. Consequently, the description and the drawings should be considered in a sense that is illustrative rather than restrictive.

The invention claimed is:

1. A feed circuit for feeding a rocket engine at least with a first liquid propellant, including at least one first heat exchanger connected to a cooling circuit for cooling at least one source of heat, wherein the feed circuit includes a first tank and a connection from the first tank that passes through said at least one first heat exchanger to a thrust chamber, and wherein the feed circuit further includes a branch branching off downstream from said at least one first heat exchanger and passing through a second heat exchanger positioned within a second tank before returning to the first tank.

2. The feed circuit according to claim 1, comprising a buffer tank for said first liquid propellant, said at least one first heat exchanger being incorporated in the buffer tank.

3. The feed circuit according to claim 1, wherein said first liquid propellant is a cryogenic liquid.

4. The feed circuit according to claim 3, wherein said first liquid propellant is liquid hydrogen.

5. The feed circuit according to claim 1, including a pump upstream from said at least one first heat exchanger.

6. An assembly comprising a feed circuit for feeding a rocket engine at least with a first liquid propellant in a first tank and a heat source, wherein the feed circuit includes at least one first heat exchanger connected to a cooling circuit for cooling the heat source; wherein the feed circuit includes a first tank and a connection from the first tank that passes through the at least one first heat exchanger for supplying the first liquid propellant to a thrust chamber; and wherein the feed circuit further comprises a branch branching off downstream from said at least one first heat exchanger and passing through a second heat exchanger positioned within a second tank before returning to the first tank.

7. The assembly according to claim 6, wherein said heat source is a fuel cell.

8. A vehicle comprising a rocket engine with at least one feed circuit for feeding the rocket engine at least with a first liquid propellant, the vehicle further including a first tank containing the first liquid propellant, wherein the at least one feed circuit includes at least one first heat exchanger connected to a cooling circuit; a heat source provided with the cooling circuit connected to said at least one first heat exchanger of the at least one feed circuit, the at least one feed circuit includes the first tank, a connection from the first tank that passes through said at least one first heat exchanger to a thrust chamber; and a second heat exchanger positioned within a second tank, and wherein the at least one feed circuit further comprises a branch branching off downstream from said at least one first heat exchanger and passing through the second heat exchanger before returning to the first tank.

9. The vehicle of claim 8, wherein the second tank includes a second liquid propellant that is different than the first liquid propellant.

* * * * *